United States Patent [19]

Stevens et al.

[11] 4,376,387
[45] Mar. 15, 1983

[54] DYNAMIC SHOCK ABSORBER EVALUATOR

[75] Inventors: Bernard Stevens, Limal, Belgium; Gregg W. Squires, Sparkill, N.Y.

[73] Assignee: Products and Patents Ltd., New York, N.Y.

[21] Appl. No.: 172,000

[22] Filed: Jul. 24, 1980

[51] Int. Cl.³ .......................................... G01M 17/04
[52] U.S. Cl. ...................................................... 74/11
[58] Field of Search .......................... 73/11, 574, 669

[56] References Cited

U.S. PATENT DOCUMENTS 3,164,003 1/1965 MacMillan ............................. 73/11
3,857,276 12/1974 Fader ..................................... 73/11

FOREIGN PATENT DOCUMENTS 2334737 4/1975 Fed. Rep. of Germany .......... 73/11
2362661 6/1975 Fed. Rep. of Germany ........ 73/669
1399629 7/1975 United Kingdom .................. 73/574

*Primary Examiner*—Charles A. Ruehl
*Attorney, Agent, or Firm*—Frishauf, Holtz, Goodman & Woodward

[57] ABSTRACT

A shock absorber testing device wherein the vehicle body is raised relative to the vehicle wheels, and is then released. The vehicle wheels are not raised. Upon releasing of the raised spring-suspended body of the vehicle, the resulting oscillations of the movement of the body is sensed, and various quality factors ($h_1$, $h_2$, $h_3$) are determined and displayed to display the dampening proficiency of the shock absorber. The damping proficiency of a pair of shock absorbers located opposite each other on the vehicle (the pair of front shock absorbers, for example) may have their damping proficiencies displayed simultaneously and compared, and the difference therebetween also displayed to indicate uneven wear or imbalance of the shock absorbers of the vehicle.

19 Claims, 32 Drawing Figures

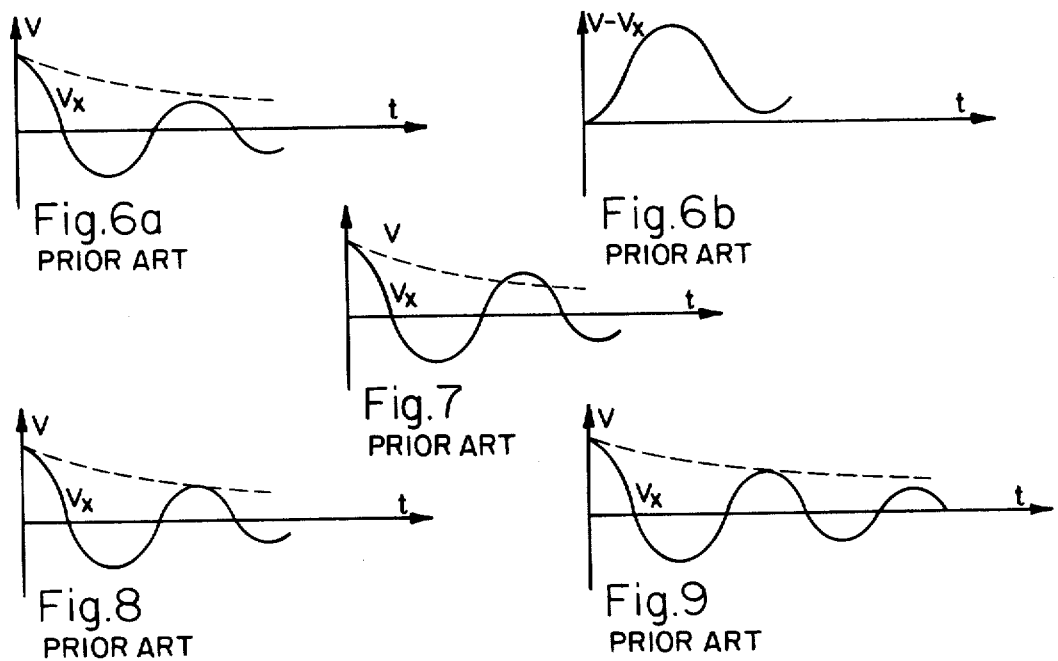
Fig.6a PRIOR ART
Fig.6b PRIOR ART
Fig.7 PRIOR ART
Fig.8 PRIOR ART
Fig.9 PRIOR ART
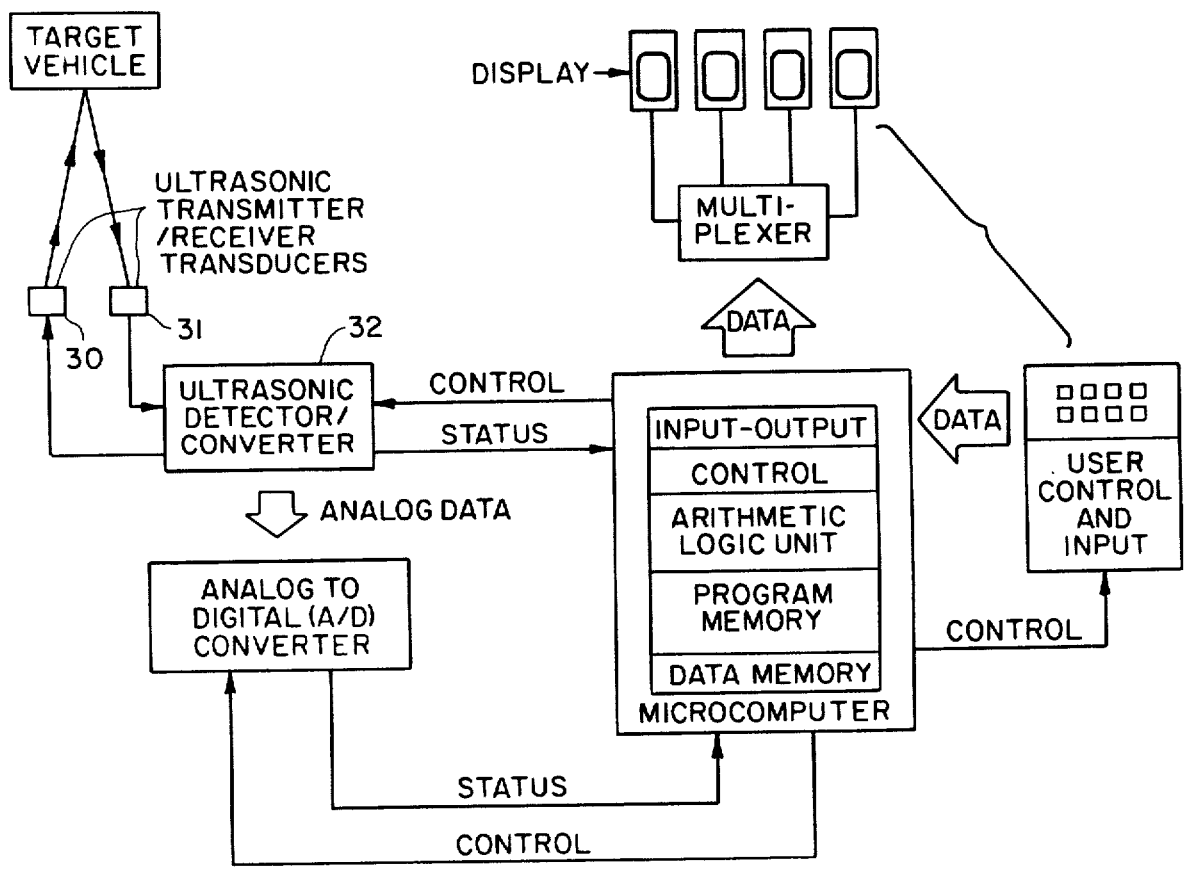
Fig.10

DYNAMIC SHOCK
ABSORBER EVALUATOR
OPERATING SEQUENCE
START
|
INPUT FUNCTION
COMMANDS
|
INPUT DATA
(SLOPE CONSTANT)
|
WAIT FOR TRIGGER
FROM DROP
|
CONVERT DISTANCE TO
VOLTAGE ANALOG
|
SAMPLE N TIMES
|
CONVERT ANALOG
TO DIGITAL
|
INPUT DATA
TO MEMORY
|
COMPUTE SLOPE
|
COMPARE WITH INPUT
SLOPE CONSTANT
|
OUTPUT DIFFERENCE
TO SCALE
|
END
Fig.11
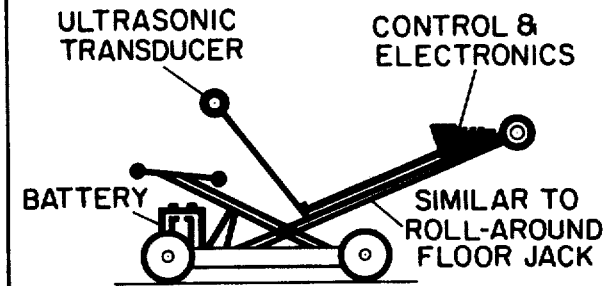
Fig.12
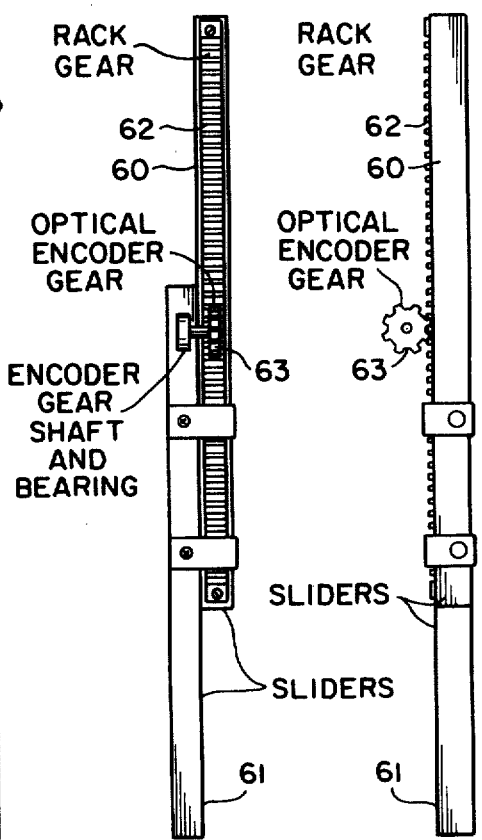
Fig.15a  Fig.15b

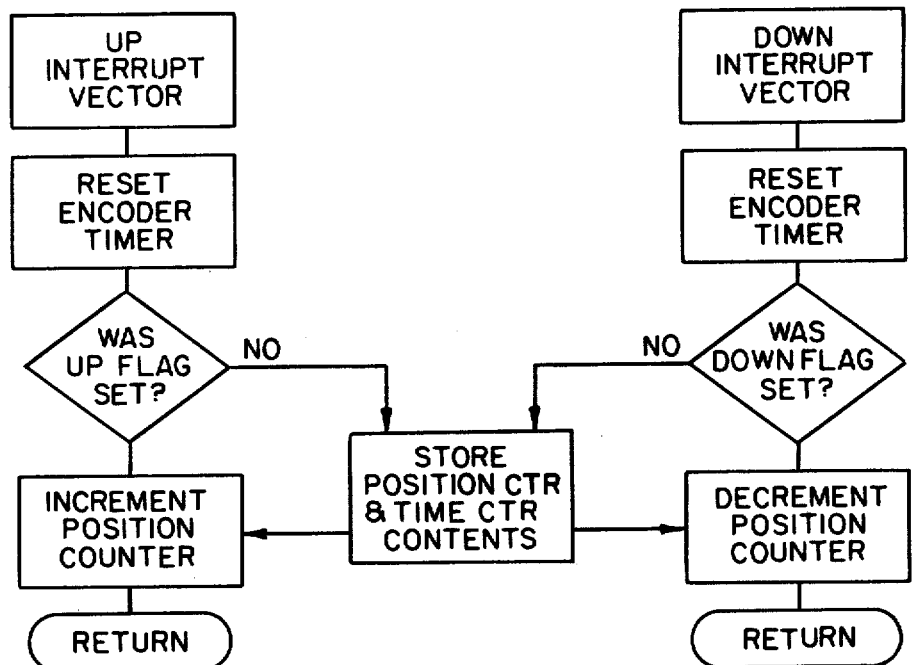
Fig.14a
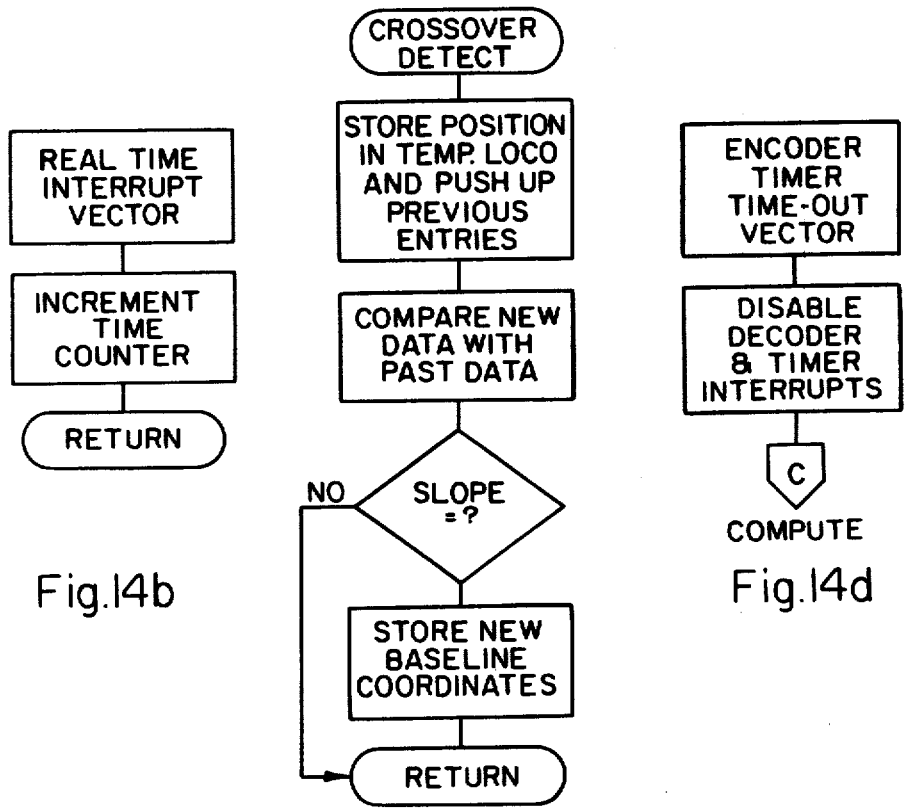
Fig.14b
Fig.14c
Fig.14d

TIMING EXAMPLE

DYNAMIC SHOCK ABSORBER EVALUATOR

BACKGROUND OF THE INVENTION

This invention relates to an apparatus and method for evaluation of suspension systems, particularly those of automobiles. More specifically, the invention is directed to evaluating the in situ performance of the shock absorbers, important components of automotive suspensions.

Known devices for testing shock absorbers requires their removal from the vehicle. This practice is highly impractical for two reasons. First, labor costs involved in the shock absorber's removal for testing and subsequent reinstallation are prohibitive, in that such costs may be equal to or greater than the cost of replacement shock absorbers. This is particularly true with shock absorbers founded in MacPherson-type suspensions (i.e., MacPherson struts) wherein removal of the shock absorber necessitates the disassembly of other suspension components, such as the spring, balljoint and brake assembly. Second, testing of a shock absorber isolated from its operating environment is believed to be unsatisfactory as its dampening ability is measured against an arbitrary standard rather than relative to the suspension system of which it is a part. As the performance of the shock absorber in conjunction with the rest of the suspension system affects the handling, ride, suspension performance, stability and safety of the vehicle, the practice of shock absorber testing as an isolated component can be seen to be unsatisfactory.

Other devices currently on the market, namely those operating on the seismograph principal do evaluate the suspension systems as a whole, but are restricted to record movement of the vehicle's body withoout allowing the deduction of the dampening factor of the system, (i.e., shock absorber performance).

The present invention overcomes the above described disadvantages by providing an apparatus and method for the evaluation of a shock absorber without removing it from its operating environment, i.e., without removing it from the vehicle.

Another prior art system is disclosed in my Belgian Pat. No. 35112, which will be discussed hereinbelow.

OBJECT OF THE INVENTION

It is an object of the invention to provide an apparatus and method for quickly and accurately evaluating the performance of a shock absorber (i.e., its damping characteristics) without first the necessity of its removal from the vehicle's suspension system.

It is another object of the invention to provide an apparatus and method for the quick and accurate evaluation of the performance of a shock absorber in relation to its operating environment, the vehicle's entire suspension system.

SUMMARY OF THE INVENTION

According to the present invention, apparatus for evaluating the dampening proficiency of a shock absorber on a spring suspended mass (such as a vehicle) relative to a non-suspended mass without necessitating removal of the shock absorber from its operating environment, comprises means for initially substantially vertically displacing the suspended mass a predetermined distance from its rest position relative to the non-suspended mass; means for quickly releasing the displaced suspended mass from its displaced position relative to the non-suspended mass, whereby the mass begins to oscillate; sensing means for sensing the resulting oscillating movement of the suspended mass relative to the non-suspended mass; means coupled to the sensing means for processing and evaluating the oscillating movement sensed by the sensing means; and display means coupled to the processing and evaluating means for displaying the evaluation of the dampening proficiency of the shock absorber.

In a preferred embodiment, the displacing means includes control means for controlling the initial displacement of the suspended mass relative to the non-suspended mass, and the processing and evaluating means comprises means for determining the maxima and minima of the oscillation of the object and means for evaluating the difference between adjacent maxima and/or minima. Still further, the processing and evaluating means preferably comprises means for determining the base line of the oscillation of the object.

BRIEF DESCRIPTION OF THE DRAWINGS

FIGS. 6a, 6b, 7, 8 and 9 are waveforms illustrating the present invention concept;

FIG. 10 is a simplified block diagram of one embodiment of the invention;

FIG. 11 sets forth the operating sequence of the embodiment of FIG. 10;

FIG. 12 illustrates a possible configuration for carrying out the present invention;

FIGS. 14a–14d are flow charts of the embodiment of FIGS. 13 and 13a;

FIGS. 15a and 15b illustrate an input transducer for use in the present invention;

FIG. 21 illustrates timing signals in the arrangement of FIGS. 13 and 13a;

FIGS. 23a–23c illustrate a concrete circuit diagram of a further embodiment of the invention;

DETAILED DESCRIPTION

Figure 1:
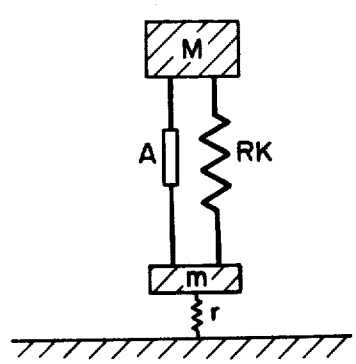
FIGS. 1 and 2 are equivalent models illustrating the present inventive concept.

As disclosed in my prior Belgian Pat. No. 35112, a vehicle suspension may be represented as shown in FIG. 1 wherein:

M represents suspended masses (body, chassis, etc.);

m represents nonsuspended masses (axle, wheel, etc.);

RK represents the springs of the vehicle for the coefficient of stiffness;

r represents the pneumatic coefficient of stiffness Rk; and

A represents the shock absorber.

Figure 2:
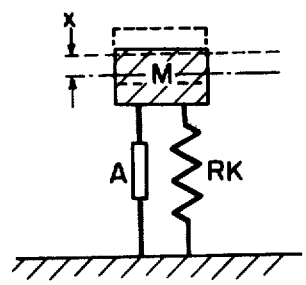

The device of my prior Belgian patent allows the evaluation of the shock absorber when the car is at a stop and therefore, the elasticity of the pneumatics could be neglected. The system then reduces to the representation in FIG. 2, wherein the same designations are used as in FIG. 1. Generally, the motional forces manifested in the shock absorber, are proportional to the relative velocity of the cylinder fulcrum, relative to the pressure cylinder (in hydraulic shock absorbers).

Below is the representative equation of the mass movement. If P represents the weight of the suspended mass and "g" the acceleration of gravity, the following will apply:

$$M = \frac{P}{g}$$

and the equation of movement would be written:

$$\frac{P}{g} \cdot \frac{d^2x}{dt^2} + c \cdot \frac{dx}{dt} + b \cdot x = 0$$

where x represents the deflection with regard to the position of equilibrium (see FIG. 2); c represents the coefficient of viscosity of the shock absorber; and b represents the coefficient of elasticity of the spring. If we pose:

$$h = \frac{c \cdot g}{2 \cdot P} \text{ and } w^2 = \frac{b \cdot g}{P}$$

the equation of movement of mass M is written:

$$\frac{d^2x}{dt^2} + 2 \cdot h \frac{dx}{dt} + w^2 \cdot x = 0$$

This is a binary differential equation of second order with constant coefficients through which the characteristic equation is:

$$r^2 + 2 \cdot h \cdot r + w^2 = 0$$

The roots of these equations are:

$$r = -h \pm \sqrt{h^2 - w^2}$$

Three trial cases could be approached according to the sign of the quantity $(h^2 - w^2)$. The three trial cases are as follows.

(a) ammortized oscillatory movement

If the damping factor is not too important, $$h < w$$

Let us pose:

$$w^2 - h^2 = s^2$$

The root of the characteristic equation are becoming:

$$r + - w \pm i.s$$

and the general integral becomes:

$$x = C \cdot e^{-h \cdot t} \cdot \cos(s.t - f)$$

The determination of the constants is done by expressing the initial conditions:

$$a t + 0 \quad x = a 0 \quad et \frac{dx}{dt} = 0$$

$$\frac{dx}{dt} = -C \cdot e^{-h \cdot t} h \cdot \cos(s \cdot t - f) + s \cdot \sin(s \cdot t - f)$$
$$a = C \cdot \cos f$$
$$0 = -C \cdot (h \cdot \cos f - s \cdot \sin f)$$

one obtains:

$$\frac{\sin f}{\cos f} = tgf = \frac{h}{s}$$

$$\cos f = \frac{1}{1 + \frac{h^2}{s^2}}$$

$$C = \frac{a}{\cos f} = a \cdot 1 + \frac{h^2}{s^2} = a \cdot \frac{w}{s}$$

$$\cos f = \frac{s}{w} \quad \sin f = \frac{h}{w}$$

The general integral of the differential equation can therefore be written:

$$x = \frac{a \cdot w}{s} \cdot e^{-h \cdot t} \cdot \cos(s \cdot t - f)$$

Because of the factor $e^{-h \cdot t}$, the movement is not periodical and the elongation and the velocity change sign periodically. The oscillatory movement and maximum elongations occur at moments that one determines by expressing that dx/dt is null $$h \cdot \cos(s \cdot t - f) + s \cdot \sin(s \cdot t - f) = 0$$
$$tg(s \cdot t - f) = -\frac{h}{s} = -tgf: \text{ therefore}$$

$$t = \frac{\pi}{s}, \frac{2\pi}{s}, \frac{3\pi}{s} \ldots$$

The pseudoperiod, i.e., the time interval between maximal successive elongations of the same sign is valued:

$$T = \frac{2\pi}{s}$$

Figure 3:
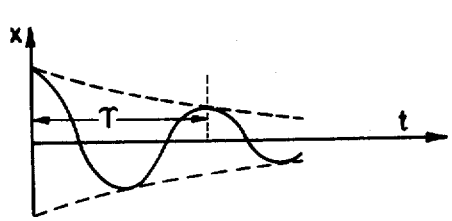
FIGS. 3 and 4 are waveforms in connection with a discussion of the present invention concept.

The ratio of two maximal elongations of the same sign yields:

$$\frac{x_1}{x_2} = \frac{\frac{a \cdot w}{s} \cdot e^{-h \cdot t} \cdot \cos(s \cdot t - f)}{\frac{a \cdot w}{s} \cdot e^{-h \cdot (t+T)} \cdot \cos[s \cdot (t + T) - f]} = e^{h \cdot T}$$

for which the neperien logarithm, d=h.T is the logarithmical decrement of the oscillatory movement. See FIG. 3.

(b) Critical amortizement

If h=w, the characteristic equation accepts a double radical and the general integral takes the form:

$$x = c^{-h \cdot t} \cdot (A.t = B)$$

The initial conditions allow the determination of the constants A and B:

$$A = a \cdot h \quad B = a$$

The particular solution sought for is:

$$x = e^{-h \cdot t} \cdot a(1 + h \cdot t)$$

Figure 4:
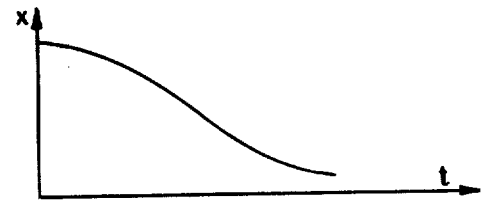

This is the critical aperiodical movement; there is no one oscillation and the elongation x is always positive. See FIG. 4. The above case (b) is of no interest, as the problem which is concerned relates to when $h \neq w$.

Aperiodical movement

If $h > w$, the amortizement is very large and one can show that the particular solution sought takes the form:

$$x = \frac{a \cdot w}{h^2 - w^2} \cdot e^{-h \cdot t} \cdot Sh(\sqrt{h^2 - w^2} + f)$$

with $Shf = \sqrt{\frac{h^2 - w^2}{w}}$ et $Chf = \frac{h}{w}$

The elongation is always positive as in the preceding case and tends toward 0 when $t \to \infty$. The mass tends toward its position of equilibrium without oscillation. This case, as the preceding one, is not of interest as it is not met in problems of vehicle suspension. It is apparent that the only interesting case concerning vehicle suspensions is the one where:

$$h < w$$

With $h = (c.g)/2P$, the knowledge of h suggests the knowledge of c. In order to know h, one could trace the diagram of the oscillations of the suspended masses at the extremity of the axle deflecting the masses from the position of equilibrium and then freeing them. A stylus attached to the body of the car could trace the graph on a moving graph paper. One could then determine the Neperian logarithm of the ratio of the two successive maxima elongations and obtaining therefore the logarithmic decrement and the value of the pseudoperiod T recorded on the graph and yielding to h:

$$h = d/T$$

The value of h could be obtained in a much simpler manner which is part of the procedure of the object of the present invention. Suffice to express the elongation "x" of the shock absorber by the following:

$$x = \left( e^{-h \cdot t} \cdot \frac{a \cdot w}{s} \right) \cdot \cos(s \cdot t - f)$$

and observe the envelope:

$$\left( \frac{a \cdot w}{s} \cdot e^{-h \cdot t} \right)$$

of the ammortized movement.

Figure 5:
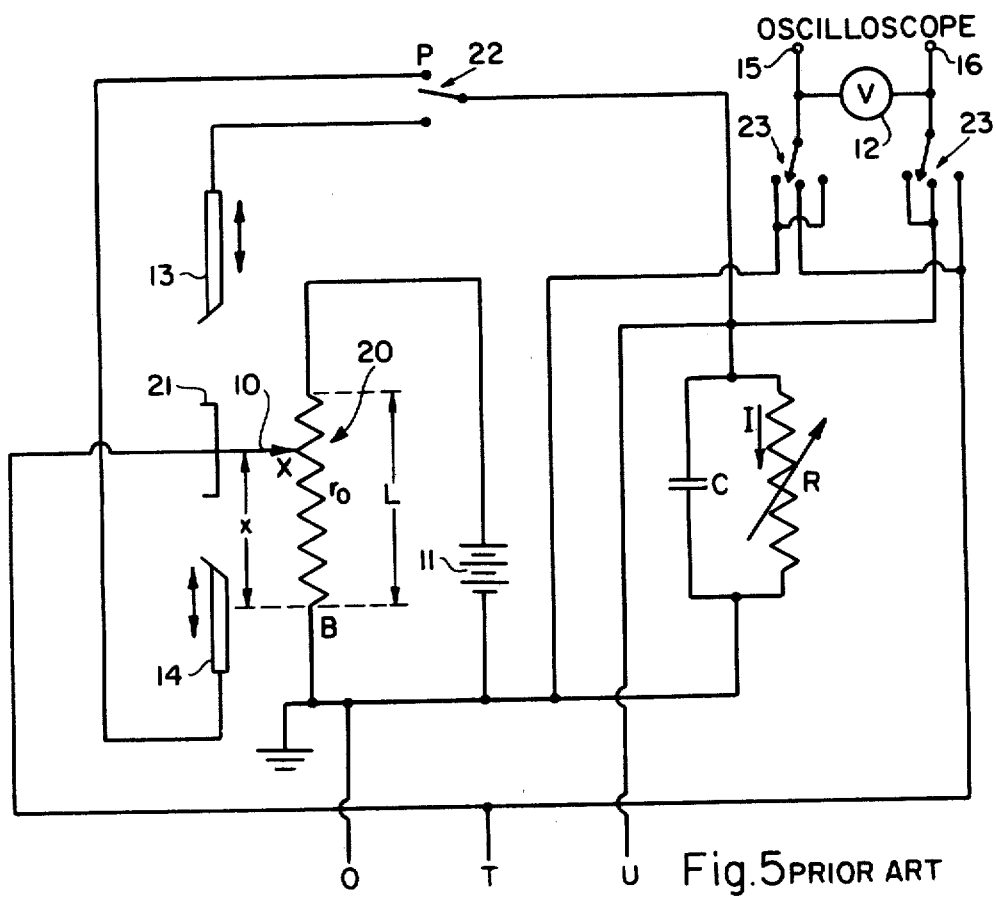
FIG. 5 illustrates a prior art apparatus for checking shock absorbers.

FIG. 5 illustrates the apparatus disclosed in my prior Belgian Pat. No. 35112 for determining the envelope of the ammortized oscillatory movement of the vehicle. In this prior arrangement, the means for sensing and evaluating movement of the vehicles body comprises a pair of electronic circuits, a first circuit yielding a proportional voltage fluctuation of the relative displacement of the suspended mass in relation to the non-suspended mass, and a second yielding a decreasing exponential voltage caused by an RC circuit with variable resistance. The first circuit involves a variable resistor $r_0$ (FIG. 5) which is coupled to the vehicle to have its resistance vary corresponding to oscillation of the vehicle.

The RC circuit of FIG. 5 will now be considered. If at the instant $t = 0$ the value of the charge of the capacitor is $q_0$, one could determine the electrical current circulating in the resistor R by application of Ohm's law, as follows:

$$R \cdot \frac{dq}{dt} + \frac{q}{C} = 0$$

where $q' + \frac{q}{RC} = 0$

This is a differential equation of the first order, with constant coefficients for which the general integral is:

$$q = D \cdot e^{-\int \frac{1}{RC} dt} = D \cdot e^{-\frac{t}{RC}}$$

The charge decreases exponentially and the constant D is determined from the initial conditions.

$$t = 0 \quad q = q_0$$
$$d'ou \quad q_0 = D$$

and the particular solution searched for is:

$$q = q_0 \cdot e^{-\frac{t}{RC}}$$

The electrical current circulating in the resistor R is equivalent to:

$$I = -\frac{dq}{dt} = -q_0 \left( -\frac{1}{RC} \cdot e^{-\frac{t}{RC}} \right) = \frac{q_0}{RC} \cdot e^{-\frac{t}{RC}}$$

and the voltage developed across the resistor R is equal to:

$$V = R \cdot I + R \cdot \frac{q_0}{RC} \cdot e^{-\frac{t}{RC}} = \frac{q_0}{C} \cdot e^{-\frac{t}{RC}}$$

At the initial instant, $t = 0$, $$V_o = \frac{q_0}{C}$$

the expression of the voltage became:

$$V = V_o \cdot e^{-\frac{t}{RC}}$$

The potentiometric circuit having a potentiometer 20 with a total resistance $r_0$ and a length L, shown in FIG. 5, will now be considered. When the cursor 10 is at position resistance r between cursor 10 and ground potential B is:

$$r = \frac{x}{L} \cdot r_o$$

where $r_o$ is the total resistance value of the potentiometer. The difference of potential between cursor 10 and ground is:

$$V_X - V_B = \frac{x}{L} \cdot r_o \cdot I \text{ with}$$

$$I = \frac{V_A - V_B}{r_o} \text{ where } V_X - V_B =$$

$$\frac{x}{L} \cdot r_o \cdot \frac{V_A - V_B}{r_o} = \frac{x}{L} \cdot (V_A - V_B)$$

By having point X (i.e., the position of cursor 10) following movements of the vehicle body as expressed above, one obtains:

$$V_X - V_B = e^{-h \cdot t} \cdot \frac{a \cdot w}{s} \cdot \cos(s \cdot t - f) \cdot \frac{V_A - V_B}{L}$$

At the instant t=0, we get:

$$(V_X - V_B)_o = \frac{a \cdot w}{s} \cdot \cos(-f) \cdot \frac{V_A - V_B}{L}$$

and, replacing cos(−f) by s/w, $$V_{X_o} = \frac{a \cdot w}{s} \cdot \frac{s}{w} \cdot \frac{V_A - V_B}{L} = a \cdot \frac{V_A - V_B}{L}$$

At the moment of maximum elongation we get:

$$t = \frac{1}{s}, \frac{2}{s}, \frac{3}{s}, \text{ etc.}$$

The maximum elongation of the same sign of the initial deflection occurs at instant t equal to 2/s. At that moment, the voltage ($V_X - V_B$) is valued:

$$V_X - V_B = E^{-h \cdot t} \cdot \frac{a \cdot w}{s} \cdot \cos(s \cdot \frac{2}{s} - f) \frac{V_A - V_B}{L} =$$

$$e^{-h \cdot t} \cdot \frac{a \cdot w}{s} \cdot \cos f \cdot \frac{V_A - V_B}{L}$$

Replacing cos f by s/w, $$V_X - V_B = e^{-h \cdot t} \cdot \frac{a \cdot w}{s} \cdot \frac{s}{w} \cdot \frac{V_A - V_B}{L}; \text{ and}$$

$$V_X - V_B = e^{-h \cdot t} \cdot V_{X_o}; \text{ with } t = \frac{2}{s}$$

As discussed above, the voltage in the RC circuit is:

$$V = V_o \cdot e^{-\frac{t}{RC}}$$

If we realize $V_o = V_x$, the difference of potential between the voltage from the cursor and the voltage supplied by the discharge of the capacitor C when t=2/s is valued:

$$V_X \cdot V = V_{X_o} \cdot \left( e^{-h \cdot t} - e^{-\frac{t}{RC}} \right)$$

The nullification of this voltage is conditional to:

$$e^{-h} = e^{-\frac{1}{RC}} \text{ where } h = \frac{1}{R.C.}$$

Suffice to vary the resistance (or the capacitor), in order to know h, until cancellation of the difference of potential ($V_X - V$) without alteration sign. For practical application, the scale of R (or C) is graduated in value of h.

A disadvantage of the circuit of FIG. 5 is that it does not correct for the vehicle settling at a different rest position after being rocked than before being rocked. Also, evaluating the results of the test requires skill on the part of the operator. Still further, evaluation of the test results requires a standard against which the test results can be prepared. It is very difficult for various shock absorber and vehicle manufacturers to agree on a standard. For informational purposes, the circuit of FIG. 5 is described below.

ELECTRONIC CIRCUIT

Referring again to FIG. 5, a variable resistor 20 with a cursor 10 is supplied with power by a battery 11. The cursor 10 is attached or coupled to the body of the car or other vehicle which at the state of rest of the car will be at about mid excursion of the cursor 10 on the resistor 20. The components of the RC circuit are chosen in such a manner to yield an exponential envelope of the least ammortized oscillation that can be obtained in a practical case. For example, by choosing a discharge voltage at the end of ten seconds $V_o/e = V_o/2.71$, one can be certain to obtain a network of exponental envelopes that would cover all the practical cases of ammortizement. In fact at the end of ten seconds, any vehicle, however defectuous the shock absorber may be, will come to rest in its initial position. The voltmeter 12 will have a large enough internal resistance as to not influence the measure by the variation of the potentiometric resistance. For a practical example one can choose the following values:
$r_o = 2,000$ ohms;
Battery: 12 V;
R = 2,000 ohms;
C = 5,000 microfarads, making RC = 10.
The discharge of the capacitor C will follow:

$$V = V_o \cdot e^{-\frac{t}{10}}$$

As a voltmeter 12 one can use a microammeter indicating 50 microamps at full swing connected in series with a high resistance of about 240 KΩ so that with a battery of 12 volts the ammeter can deviate to full scale. The voltage will not be influenced by the displacement of the cursor 10 as that resistance is 120 times larger than the potentiometric resistance $r_o$ (i.e., $r_o = 2,000\Omega$).

The circuit includes two contacts 13,14 that can slide vertically which are positioned above and below the contact 21 on cursor 10. They can be inserted in the circuit by a switch 22 allowing determination of the positive and negative displacement of the envelope by realizing: $V_o = V_{X_o}$. This sets the initial voltage on capacitor C.

The voltmeter 12 may also by the use of a switch 23 indicate successively the voltage of the cursor 10, the discharge voltage of the capacitor C or the difference between those two voltages from which the cancellation without change of sign allows the determination of h.

It is also possible to connect an oscilliscope (not shown) across terminals 15,16 that would display the same observation that can be read on the voltmeter 12.

The practical process in order to insure that $V_o = V_{X_o}$ is the following: The chosen microswitch is positioned against the cursor. When the vehicle is raised (or lowered) by a predetermined amount from its rest position, the cursor 10, interdependent of the body, activates the microswitch which applies to the RC circuit a voltage equal to the voltage at the cursor 10. When the vehicle body is released, the microswitch remains in its previous position interrupting the supply to the RC circuit, allowing the discharge of the capacitor C.

METHOD OF MEASURING THE AMMORTIZEMENT (1) The cursor 10 is placed at mid course of the resistor 20 and interdependent with the vehicle body in line with the axle where the shock absorber is to be measured.
(2) The microswitch (13 or 14) corresponding to the sign of the oscillations from which the envelope is scrutinized is selected.
(3) The scale to medium ammortizement (read either on the resistor scale or the capacitor scale) is positioned.
(4) The vehicle is raised (or lowered) a few centimeters and released abruptly.
(5) Three cases may then occur. These cases will be analyzed in the case of the determination of the envelope resulting from positive oscillation.

(a) Case in Point of an Ammortizement Too Small

Referring to FIGS. 6a and 6b, when the vehicle body rises to its maximum position, the difference of potential $V - V_x$ does not cancel out but is the difference between the voltage V and $V_x$.

It is necessary to modify the resistor R (or the capacitor C) before repeating the trial until the obtention by successive approximations of the cancellation of the voltage V, $V_x$, without change of sign when the body goes through a maximum displacement.

(b) The chosen ammortizement is too large

Referring to FIG. 7, when the vehicle body goes through a maximum displacement the voltmeter indicates a negative voltage $V - V_x$. The resistor R (or the capacitor C) should be modified before repeating the trial towards the sense of diminishing ammortization until the obtention by successive approximations of the cancellation of the voltage $V - V_x$ without change of sign when the body goes through a maximum displacement.

(c) The chosen ammortization is correct

As seen in FIG. 8, the voltage $V - V_x$ cancels without change of sign when the body goes through a maximum displacement and the value of the ammortization h can be read on the scale of R (or C).

Practical Application

A table giving the ammortization h corresponding to the front and rear axle of all types and brands of vehicle could be established. However, as mentioned above, a difficulty is getting agreement by the vehicle and various shock absorber manufacturers.

Furthermore the value of the optimum ammortization and the value of the minimum admissible ammortizement of a shock absorber in good operating condition can also be established.

Some types of suspensions do not engender oscillatory movements which follow perfectly the law of the ammortized oscillatory movement causing the envelope of the successive oscillations of being somehow different from the exponential form $K.e^{-h.t}$ As can be seen from FIG. 9, the third maximum of the $V_x$ curve is not tangent to the exponential envelope of the two first maxima. However, the determination of the exponential gives somewhat an idea of ammortization and allows therefore to compare the coefficient h measured to the coefficient of a new suspension published in one table.

PRESENT INVENTION

According to the present invention, instead of generating signals corresponding to the curves illustrated in FIGS. 1–9, signals are generated corresponding to the maximum deflection of a rocked vehicle on both shock absorber expansion and compression, and differences are calculated. The test is performed on both wheel suspensions (at front and/or at rear) and the results are compared. If the suspension is balanced, the results should be similar at both wheels of the front or of the back. If the results differ over a predetermined amount, this is an indication that at least one shock absorber is defective and that the pair should be replaced. If the test results show excessive vehicle oscillation, this also indicates defective shock absorbers.

In a first embodiment of the invention, illustrated in FIG. 10, the means for sensing the movement of the vehicle's body relative to the ground or wheels comprises a transceiver 30,31, such as an ultrasonic transceiver, which may be mounted by a suction, magnetic or similar mounting to the vehicle's body at the desired position. In this embodiment, the means for evaluating the data on body movement collected by the sensing device comprises an analog circuit 32. The necessary parameters employed by the circuit are obtained by measuring the distance of the vehicle's body from the ground versus time. This is achieved by measuring the Doppler shift of the ultrasonic signal (or other signal) from a fixed point on the vehicle's body, reflecting off the ground plane or other plane fixed relative to the ground, and returning to the point of origin at the transceiver. The resultant data is then subjected to appropriate processing, compared with a reference and the results displayed in an interpretable format. The operation principles and sequence of the FIG. 10 embodiment of the invention are set forth in the flow diagram of FIG. 11.

The embodiment of FIG. 10 allows for the utilization of a compact, portable apparatus such as shown in FIG. 12.

In a further embodiment of the invention, the means for sensing movement of vehicle's body comprises an optical sensing device. In other respects, the apparatus of this embodiment operates identically to the analog device of the FIG. 10 embodiment. This device is highly economized, easy to operate and provides perhaps a more accurate result than that of the device in the FIG. 10 embodiment employing an ultrasonic transceiver since the data acquired is already in digital form and arithmetically processed. In contrast, the device of the FIG. 10 embodiment employing an ultrasonic transceiver compared data with a logarithmic analog. This digital format simplifies the acquisition and display of data.

Figure 13:
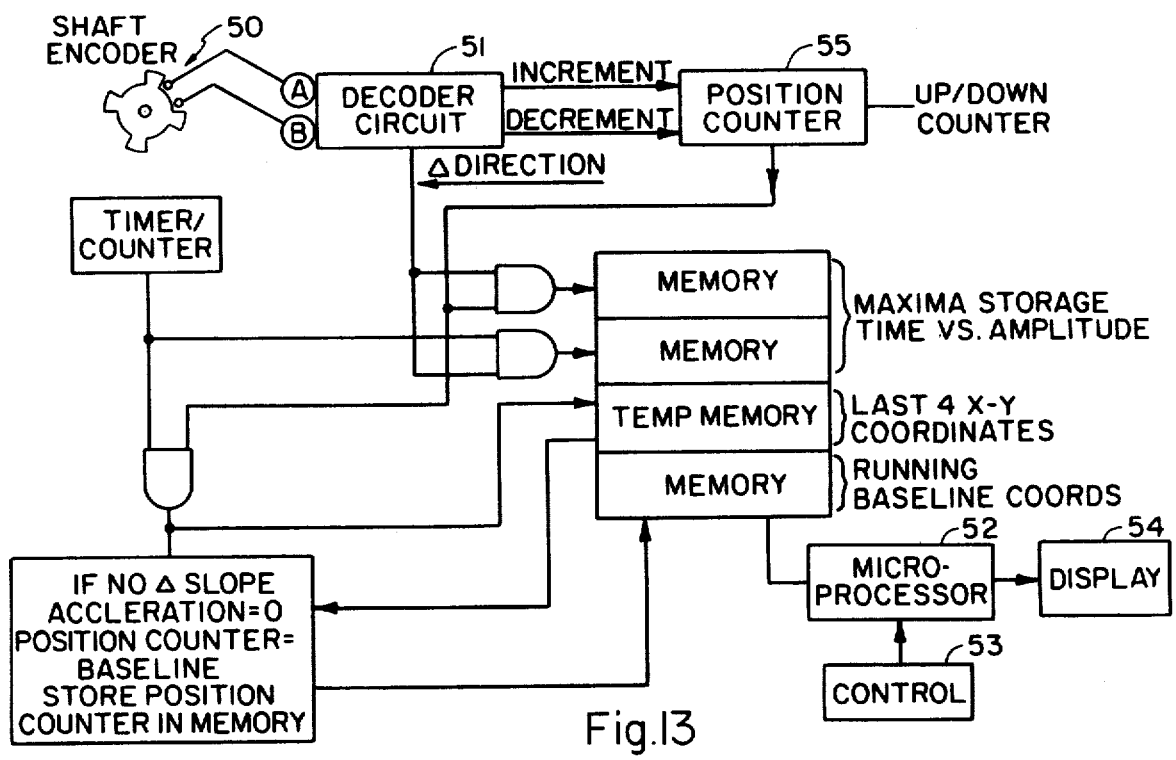
FIGS. 13 and 13a are simplified illustrations of another embodiment of the invention.
Figure 13A:
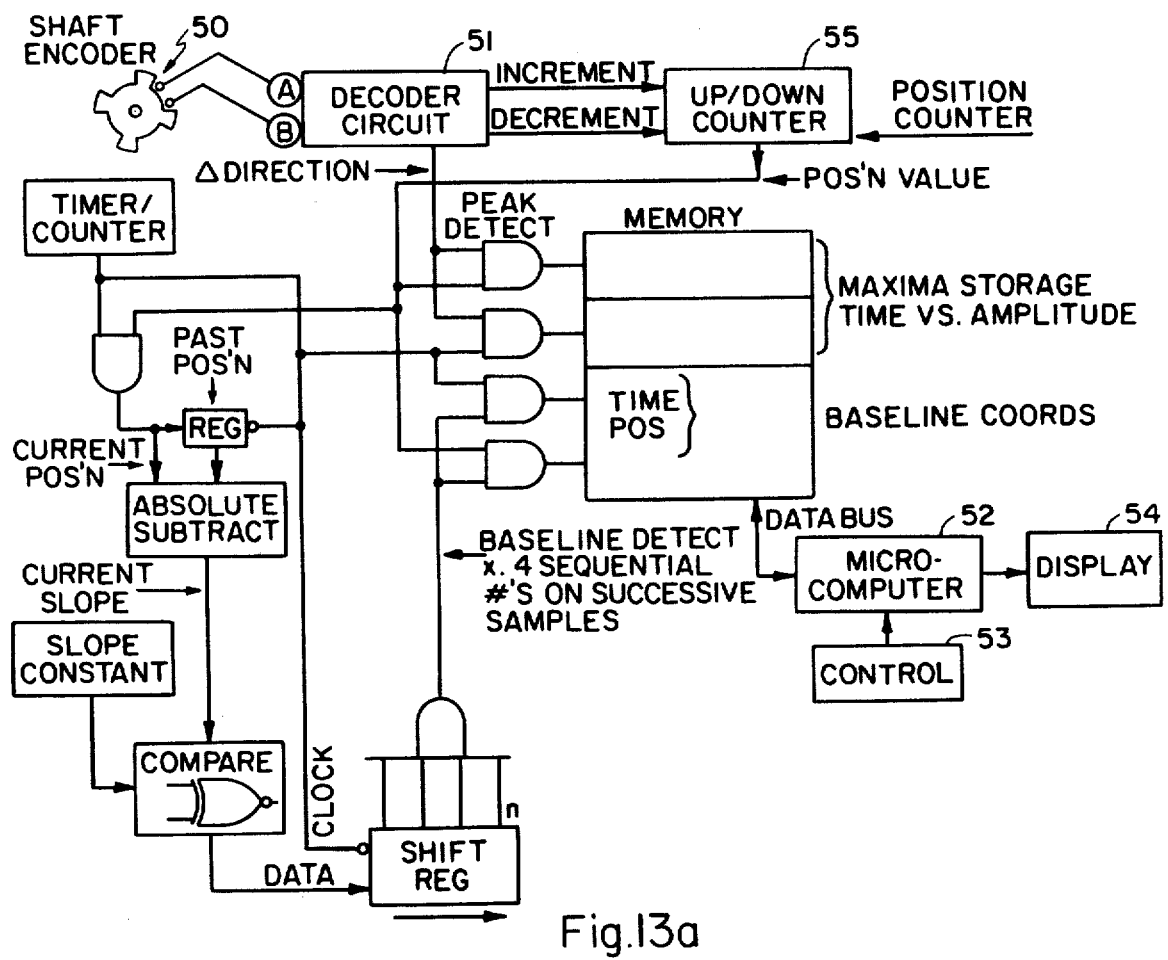

FIG. 13 illustrates a design of a measuring device for the evaluation of automobile suspensions, specifically shock absorbers which operates on a digital basis. Digitization of the input data in this design provides simple and accurate mathematical manipulation of data, and display of a numeric result. Results displayed by the apparatus of FIG. 13 require minimal interpretation by the operation. The device is very economical, easy to operate, and provides an accurate result.

Referring to FIG. 13, the shock absorber evaluator of this embodiment comprises an optical encoder 50. Decoder 51, microprocessor 52, control 53, and display 54. The details of these elements are discussed hereinbelow.

The output of the optical encoder 50 is connected to a decoder circuit 51 which decodes the direction of its rotation to thereby indicate expansion or compression of the shock absorber of the rocking vehicle. The microprocessor 52 has input and output terminals, interrupt inputs, program and data memory. Inputs to the microprocessor are from the decoder and operator controls 53. Outputs from the microprocessor control the numeric display 54 and status indicators. Now shown is a power supply, obtained from batteries or AC mains.

In operation, the vehicle to be tested is raised a given height from the surface on which it rests. The wheels remain on the surface. The measuring device then initialized. The vehicle is quickly released in such a manner that it is able to fall freely. The encoder 50 detects this movement, signaling the microprocessor to begin measurement. The microprocessor receives input data from the decoder and processes it until the end of the measurement cycle. The microprocessor performs the necessary arithmetic operations on the data it has received to produce a numeric output, the value of h. The output is displayed for the operator. FIGS. 14a-14d illustrate the operating sequence of the apparatus.

The principles of computing the result are different from those discussed above with respect to the analog embodiment of FIG. 5. One difference between this digital design and the analog design is that information is acquired directly in digital form and processed arithmetically. In the analog device the measurement was compared with a logarithmic analog. The digital format simplifies the aquisition and display of data in terms of cost, complexity, and ease of use. The details of the digital design are discussed below.

The input transducer (i.e., optical decoder 50 of FIG. 13) converts an increment of change in the test vehicle's body height into an electrical pulse. Each pulse will then represent a change in height of one unit measure. A typical input transducer, shown in FIGS. 15a and 15b, comprises two lengths 60,61 of material, called sliders, which are bound together so that they are free to slide relative to each other adjacent the length of their axes. On one slider 60 a rack gear 62 is attached along its axis. To the other slider 61, a circular gear 63 is attached which is free to run with its teeth enmeshed with the rack gear 62. In this manner, one rotation of the circular gear 63 represents a change in distance between the extremities of the sliders 60,61 equal to the circumference of the gear 63. If one of the sliders is attached to the surface on which the test vehicle rests, and the other slider is attached to the body of the vehicle, measurement of change in the vehicle's height can be made by counting revolutions of the gear 63, or by measuring the degree of rotation of gear 63.

Figure 16:
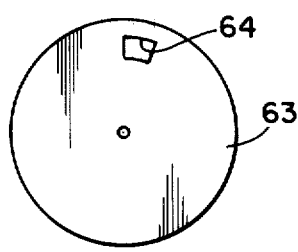
FIGS. 16–19 illustrate optical encoders for use in the present invention.
Figure 17:
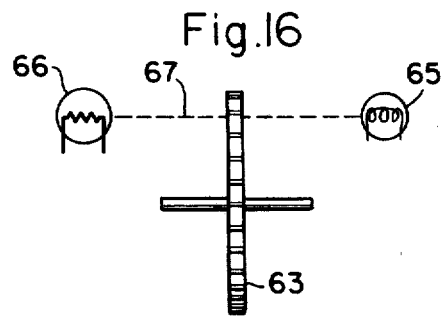

One simple method of obtaining an electrical pulse is to make a hole 64 in the gear 63, as shown in FIG. 16. Accuracy of the encoder is plus/minus one unit measure ($2\pi r$). As shown in FIG. 17, a light source 65 is mounted on one side of gear 63, and a light sensor 66 is mounted on the other side of gear 63. The light path 67 is established when the opening or hole 64 of gear 63 is in alignment with light source 65 and sensor 66, and is sensed as described below.

Figure 18:
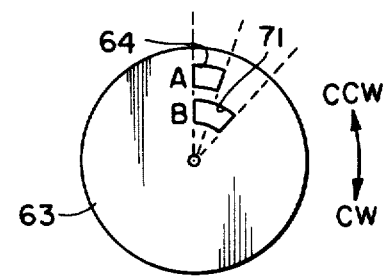
Figure 19:
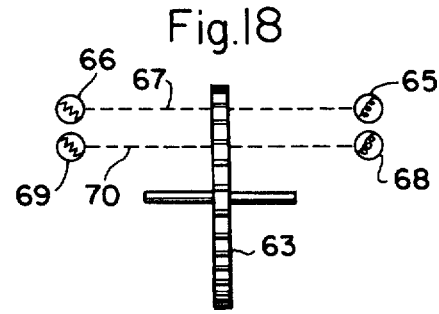

In addition to the amount of movement, it is necessary to establish the direction of movement of gear 63. One method is to provide a second optical path through the encoder gear 63. The differences between the optical signals describe the direction of rotation in a manner that can be interpreted by the microprocessor. In this example, as shown in FIGS. 18 and 19, a second hole 71 is positioned below the first hole 64, with one edge aligned with the edge of the first hole 64 along a radius of the encoder gear 63. The second hole 71 allows the optical path of the second detector to be complete for a greater angle of rotation than the first. In one direction of rotation both optical paths are completed simultaneously, while in the opposite direction they are completed at different times. A light source 68 and sensor 69 are provided for the second optical path 70. A common light source could be used for both optical paths 67 and 70. An alternative arrangement is to provide two sensors adjacent each other (as seen in FIG. 13), and the direction of rotation of the gear is determined by detecting which sensor is acivated first.

The logical relationships for the instant of first completion of an optical circuit of FIG. 19 are as follows: If paths 67 and 70 are simultaneously closed, then direction=up. If paths 67 and 70 are not closed simultaneously then direction=down.

The decoding of directional information may be accomplished in one of two ways. First, a combinational network of logic elements can be constructed. Second, the microprocessor may be programmed to carry out the same functions sequentially.

Figure 20:
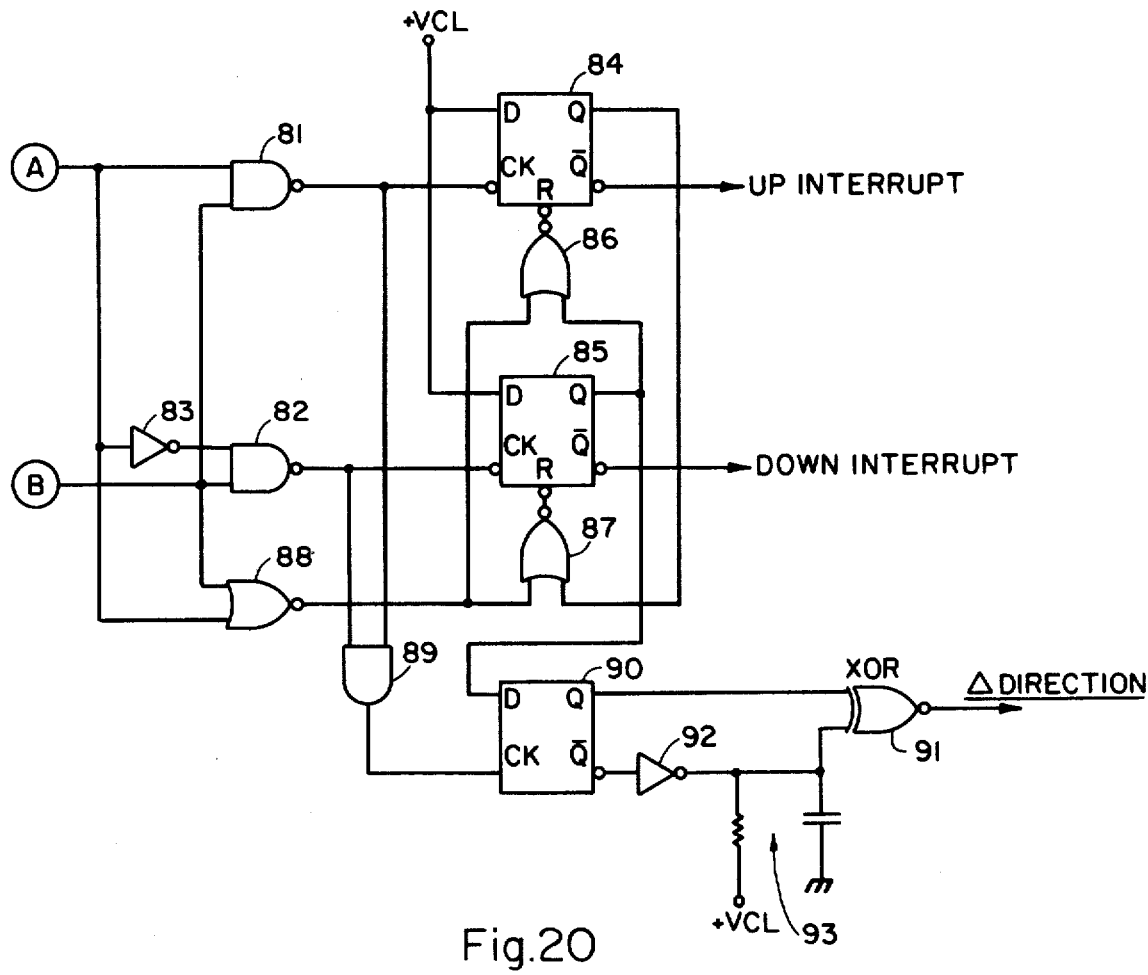
FIG. 20 illustrates a typical decoder circuit for use in the FIG. 13 embodiment.

FIG. 20 illustrates a logic circuit which provides separate outputs for each direction of rotation, and also an output indicating a changing direction. Assume that counter-clockwise (CCW) rotation (FIG. 18) means "UP", and vice-versa. In CCW rotation, optical circuits 67 and 70 will be completed at the same instant, satisfying the logical function "A and B". Assuming that the optical circuits register logical high when active, the output of NAND gate 81 will go low, clocking the hard-wired high on the data input of latch 84 to its output Q. As the encoder gear 63 continues to rotate CCW, input A will go low below input B, causing NAND gate 82 to go low. This condition is prevented from being passed to to Q of latch 85 by NOR gate 87, disabling latch 85 in this case. Thus, only the first condition to be satisfied at each revolution can be latched at the decoder output, which is cleared by NOR gate 88 when both A and B become inactive.

Figure 21:
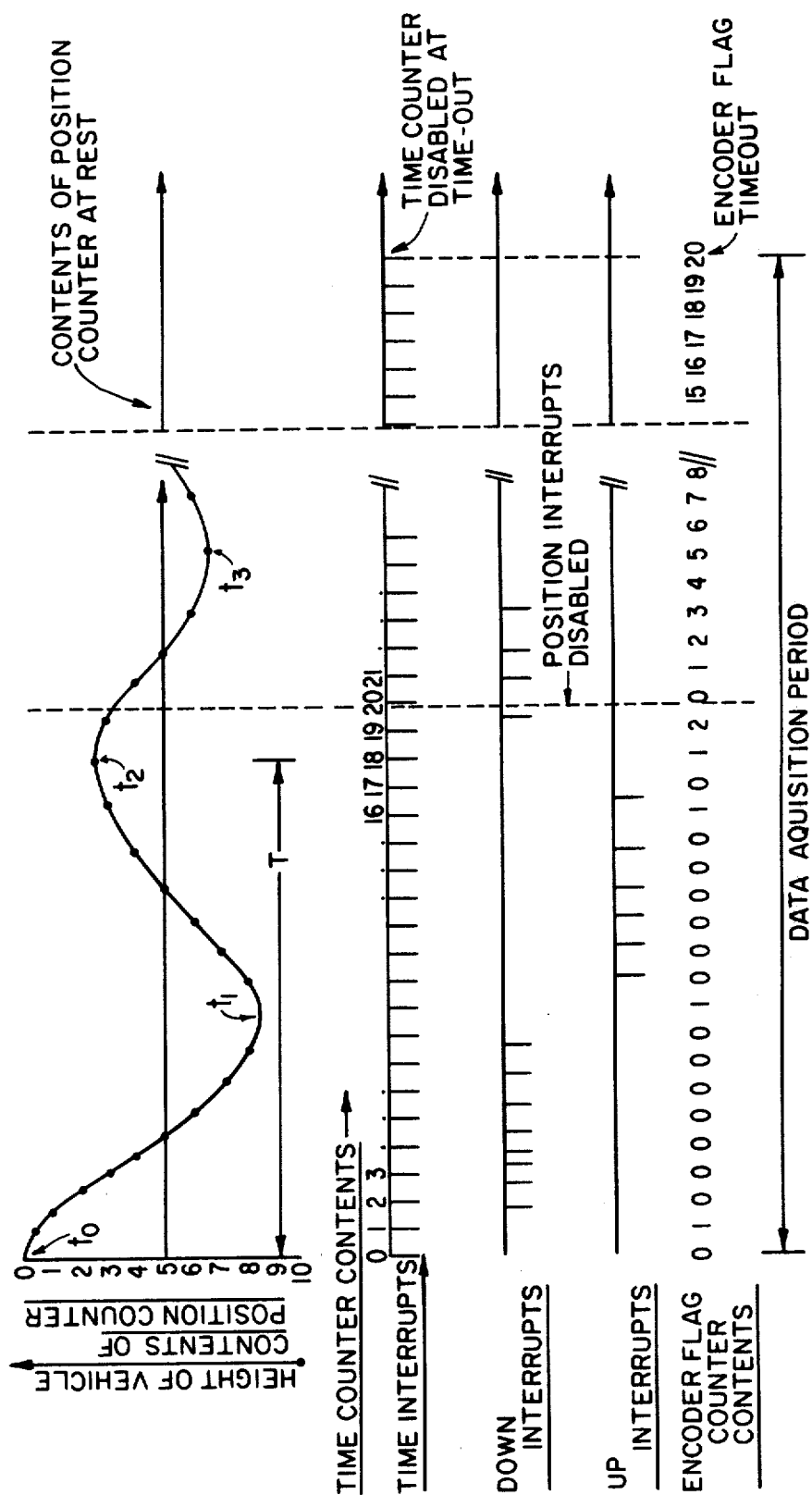

For directional decode by a microprocessor under program control, A and B would be connected to microprocessor 95 inputs, and an interrupt is generated by a single NOR gate 90 as shown in FIG. 21. Sequential logical manipulation of the input data will decode the directional information.

To indicate change of direction of gear 63 (that is, change from expansion to compression of the shock absorber or vice versa) AND gate 89 receives the outputs of NAND gates 81 and 82 and feeds its output to latch 90. One output of latch 90 is fed directly to an XOR gate 91 and the other output is fed to XOR gate 91 via an inverter 92 and RC circuit 93. The output of gate 91 indicates change of direction.

The microprocessor 52 is programmed to make the measurement in a two step process. First, the data is acquired. Second, data is processed through the necessary arithmetic operations to obtain the numeric value of h.

The microprocessor 52 is capable of operating in real time. Therefore, it is possible to plot in memory the height of the test vehicle versus time. The process and result are analogous to a stylus attached to the body of the vehicle tracing the oscillations on moving graph paper (see FIG. 21). By interrupting the processor periodically, the incrementing a register, a measure of time is recorded. If an output pulse from the decoder causes an interrupt to the processor, and the update of a storage register, a running tally of the position of the vehicle is maintained.

Assuming the decoder logic of FIG. 20 with each directional output causing a unique interrupt, reference is made to FIG. 14 for a more detailed operation of the device. It can be seen that the service routine for an UP interrupt updates a directional flat (indicating the direction of the previous decoder output) and a position counter; no further data is stored. This is because a change in direction from down to up does not represent a maximum of the sign at $t_o$ (see FIG. 21). However, in the case of a DOWN interrupt, if a change in direction (from up to down) is detected, the time and position are recorded as this represents $t_2$. When the data for time $t_2$ has been recorded, no further positional information is required and the decoder interrupts are disabled.

The encoder flag serves to indicate that the vehicle has come to rest. The program assumes that after N time periods the vehicle has ceased to move. The value of the position counter 55 of FIG. 13 is stored at times $t_0$, $t_1$, $t_2$, etc.

As described hereinabove, in order to determine h, the following equation is used:

$$h = d/T$$

Referring to FIG. 21, below are the mathematical calculations made by the microprocessor from the data collected:

$$h = \left( \log \frac{\text{position at } t_o}{\text{position at } t_2} \right) / T$$

Now, to measure expansion ($h_1$), $$h_1 = \left( \log \frac{\text{position at } t_1}{\text{position at } t_2} \right) / (t_2 - t_1)$$

To measure compression ($h_2$), $$h_2 = \left( \log \frac{\text{position at } t_2}{\text{position at } t_3} \right) / (t_3 - t_2)$$

where $t_3$ is the next maximum (or minimum) following $t_2$.

To measure total damping ($h_3$), $$h_3 = \left( \log \frac{\text{position at } t_1}{\text{position at } t_3} \right) / (t_3 - t_1)$$

Figure 22:
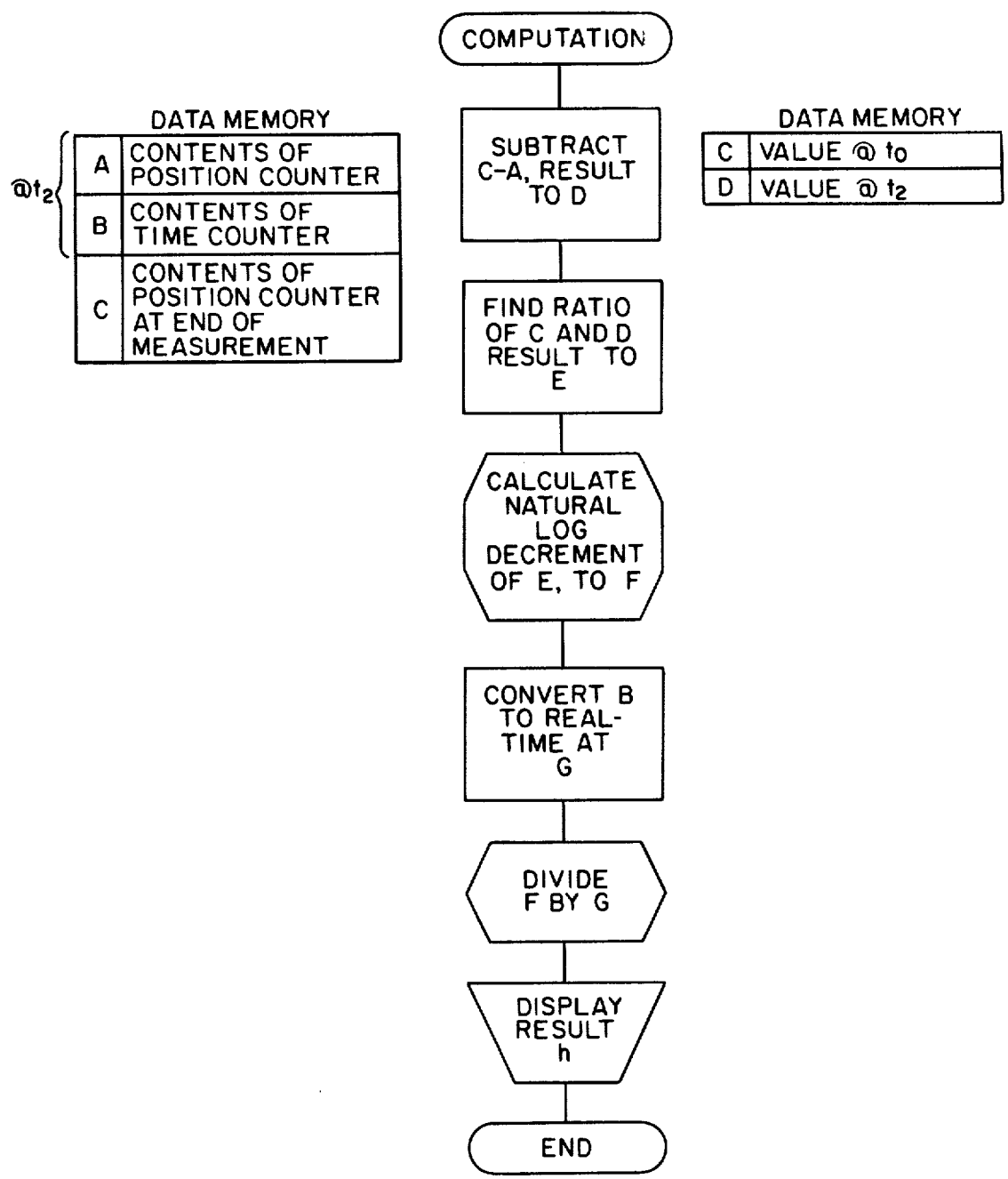
FIG. 22 is a computation flow chart illustrating how the computations of the present invention are carried out.

The initial height of the vehicle is equal to the value of the position counter with the vehicle at rest, stored at location C (see FIG. 22). This is because the counter was initialized at the initial height of the vehicle. For the same reason, the height at time t2 is determined by subtracting the position value at location A from the 'baseline' value of the vehicle at rest. This method of determining the height of the vehicle has the advantage of being self-calibrating. It does not depend on an exact initial displacement. It is also a simple matter for the microprocessor to perform scaling conversions to achieve the desired values.

Computation proceeds by finding the natural logarithm of the ratio of adjusted values at t0 and t2. The logarithmic decrement divided by G (FIG. 22) will result in the value of h.

In the simplest realization of the device, only an ON-OFF switch, and momentary RESET switch would be required as controls. A numeric display switch would be required as controls. A numeric display with a number of digits sufficient to achieve desired accuracy, and a READY indicator to display microprocessor status would suffice as the output.

In such a simple configuration, the operator might enter the ideal value of h for a given vehicle into the system via a keyboard input. The microprocessor would then compare the results, and allowing for tolerances provide a 'good-bad' indication.

More elegant controls and display arrangements are possible. For example, the capabilities of the microprocessor might be more fully exploited by the use of a CRT graphics display. In addition to a numerical display, the data could be plotted as a graph (as in FIG. 21), and perhaps superimposed over an ideal plot. This would increase the diagnostic value of the device, while requiring more skillful interpretation of the results.

Figure 23A:
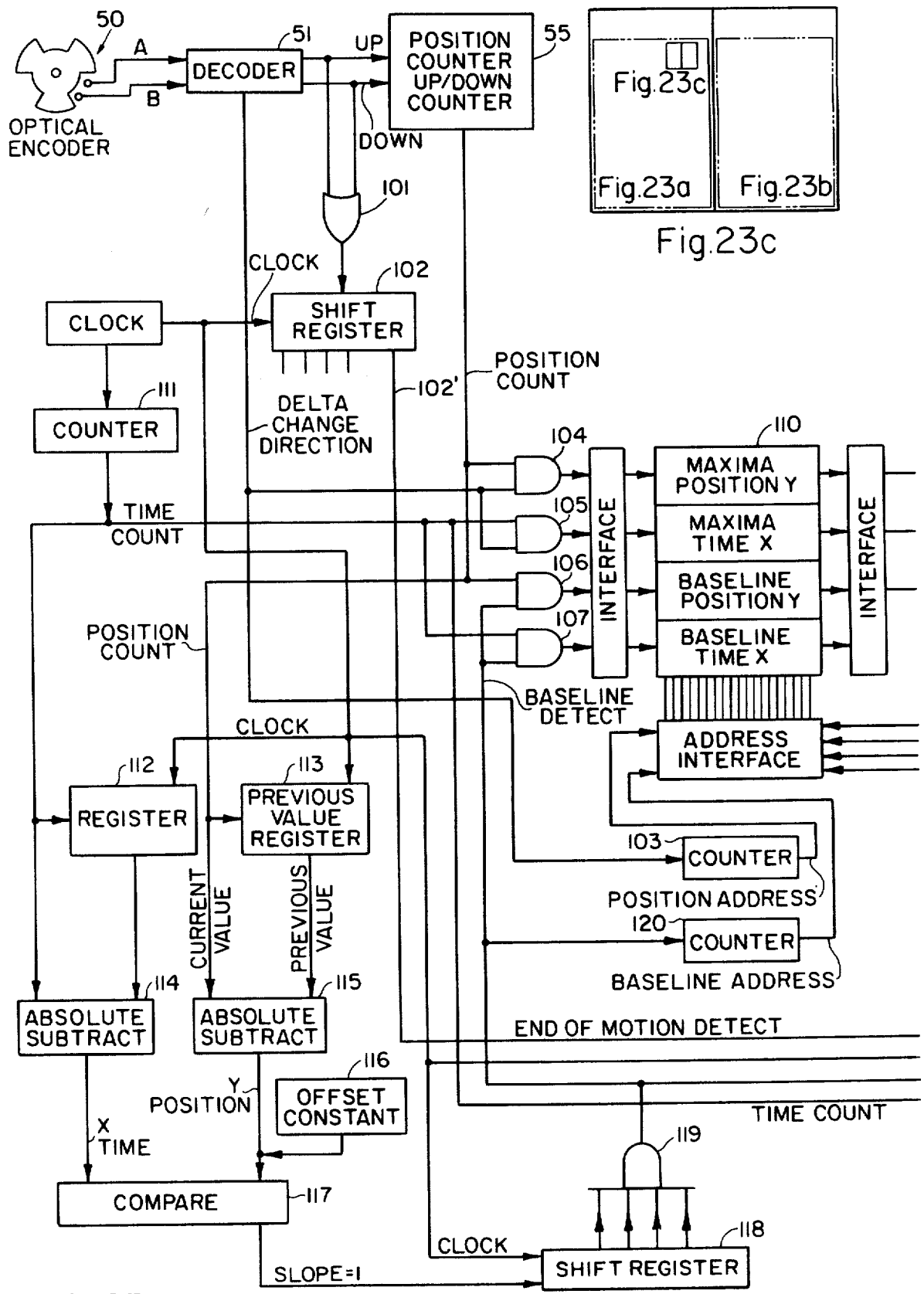
Figure 23B:
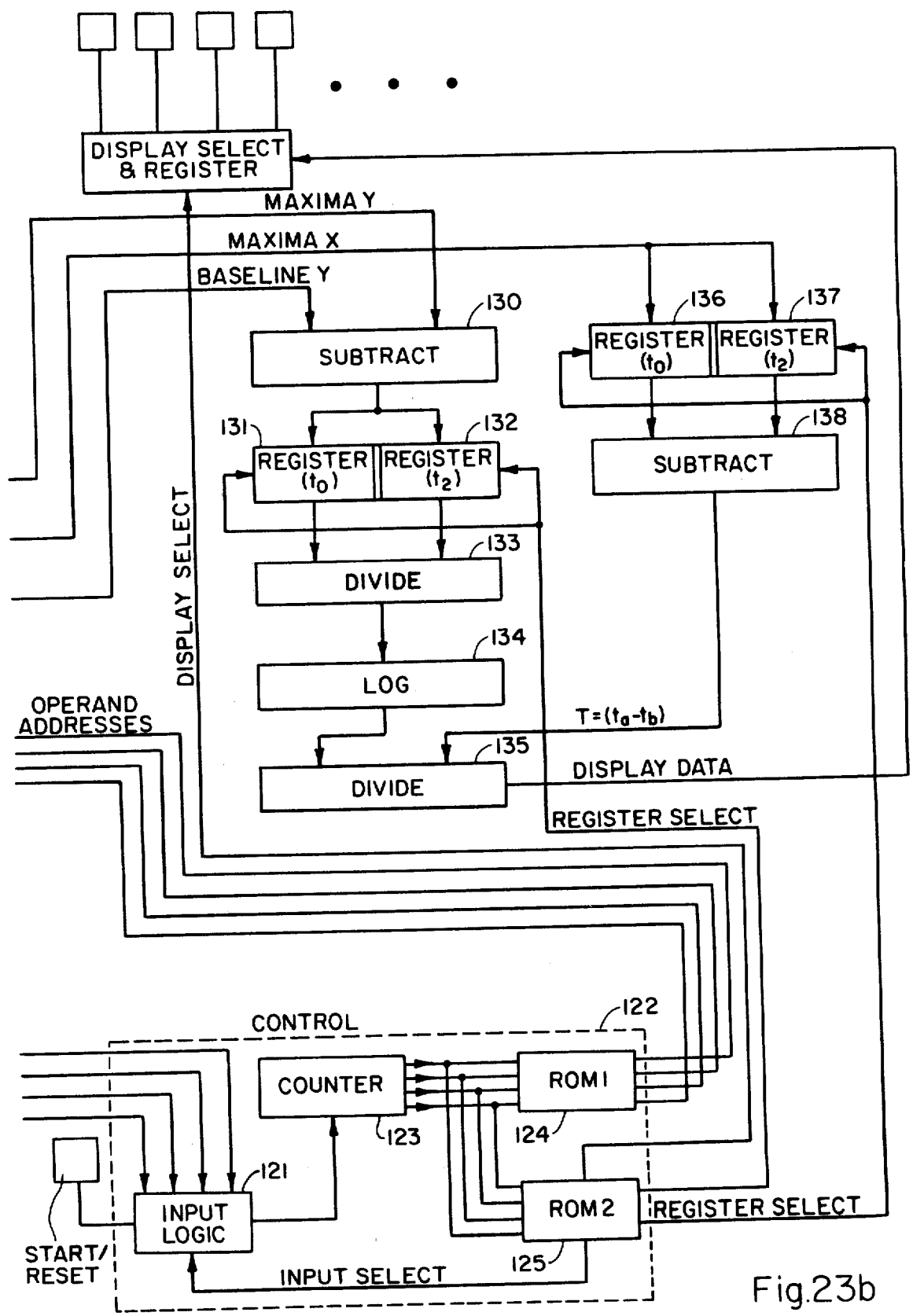

FIGS. 23a-23c illustrate a concrete circuit realization of an apparatus according to the present invention. The optical encoder 50, similar to the previously discussed optical encoders, has outputs A and B which are coupled to a decoder 51 (see FIG. 20), the output of which is coupled to a position counter 55. The outputs of decoder 51 are also gated through an OR gate 101 into a shift register 102. The Δ (change) direction signal from the output of gate 91 in FIG. 20 is coupled to a counter 103 and also to gating circuits 104 and 105.

The position count output of the up/down counter 55 is coupled to gate 104 as well as to gate 106, and also to a circuit for determining the cross-over point of the oscillating vehicle relative to the base line. See FIG. 21. The circuit for detecting the base line will be described below.

As described previously, the up/down position counter 55 generates a "Δ direction" signal which becomes active when a change in direction is detected. The "up" signal causes the position counter 55 to increment its count by 1. A "down" signal decrements the count by 1. The Δ direction signal increments the position address counter and simultaneously gates the position counter value into the memory 110 at the appropriate address, thus satisfying the requirement for recording the value corresponding to the vehicle position at each maximum (or minimum) of vehicle oscillation. See FIG. 21. The time or "Y" value, at which a maximum or minimum occurs is obtained from the clock counter 111, which time is also gated into the memory 110 at the appropriate address through gating circuit 105. The time or "Y" value is also gated into a register, the address of which is offset by a constant from the value of the position address counter.

The base line of the sinusoidal waveform shown in FIG. 21 can be assumed to be the position when the slope of the sinusoidal waveform is equal to one. The position and time values of each base line occurrence are obtained by detecting a slope of 1 in the sinusoidal signal as measured for a time period equal to N clock cycles. The difference between the "X" (value of maximum or minimum) and "Y" value (the time at which position occurs) from each clock period to the next is obtained by storing the last value in respective registers 112, 113 and subtracting it from the next present value in subtractors 114, 115, respectively. At the time the updated present value is fed to the subtracting circuits, the registers 112, 113 are also updated so as to be set for the next subtraction cycle. The result from the subtractions in subtractors 114, 115 is offset by a constant 116 so that the two values are of comparable nature. When the values at the outputs of the subtractors 114, 115 are equal, as detected by the comparator 117, the slope is 1 (slope=X/Y). The logical representation of this condition is fed into a serial-to-parallel shift register 118, the outputs of which are monitored by an N input AND gate 119. When a slope of unity has been detected for N clock periods, the AND gate 119 will generate an output designated as a "base line detect" output which will cause the base line address counter 120 to be incremented. The current X and Y values are then gated into the memory 110.

The OR gate 101 coupled to the output of the decoder 51 generates a "motion detect" signal which is fed into a K bit shift register 102. After K clock periods, an end of motion detect signal is generated on the line 102' at the output of register 102 and is fed into the sequencing logic 121 which comprises a counter, ROM's, input gating, etc. This causes the circuit to ignore further inputs from the encoder 50 and to commence a computation operation. The aforesaid is the data acquisition cycle. The data computation cycle is described below.

The control circuit 122 is of generally conventional design and generates the various address and control signals to access the necessary positions in memory, and to perform the necessary "housekeeping" in the system. A detailed discussion thereof is not necessary for those skilled in the art. A brief discussion thereof is given below.

With a clock signal gated into the sequencer counter 123, the output ROM 124 successively selects data from the memory array 110 in the order in which it was stored. Each maximum (and minimum) value and base line value is directed through the appropriate arithmetic function block (to be described hereafter) and the derived operands and intermediate functions are stored in temporary registers under the control of the sequencer ROM 125. Final results are coupled to the appropriate display registers for visual display, as will be described hereafter. Display logic permits comparison of measurements for various shock absorbers. At the conclusion of a computation cycle, the sequencer ROM 124 enables the start/reset input, which initializes the circuit so that another data acquisition cycle can begin.

The arithmetic section comprises a subtractor 130, registers 131, 132, divider 133, logarithmic circuit 134 and divider 135. A second section of the arithmetic circuit comprises registers 136, 137 and subtraction circuit 138. The output of subtractor circuit 138 is coupled to the divide circuit 135, the output of which is fed to the display and display logic section. The arithmetic circuits mentioned immediately above perform the calculations to determine the value $h_1$, $h_2$ and $h_3$, as discussed above with reference to FIG. 21.

Figure 24:
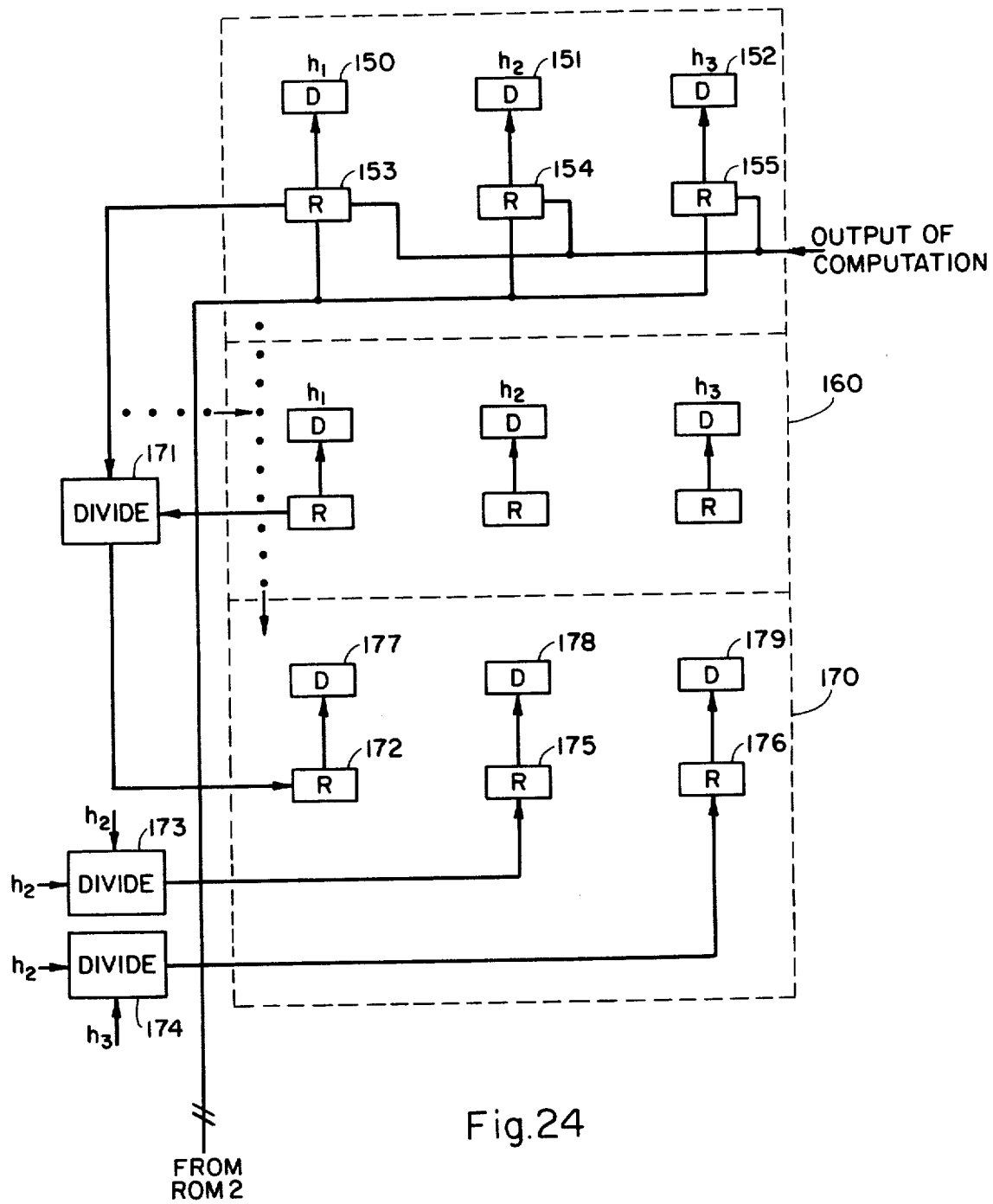
FIG. 24 illustrates a display arrangement and display logic for use in an embodiment of the invention.

FIG. 24 illustrates an alternate display arrangement wherein display sections 150, 151, 152 are provided for displaying the values of $h_1$, $h_2$ and/or $h_3$. Alternatively, the displays 150-152 may comprise warning lights which will display an indication that one or more of these values exceeded a predetermined limit. The output from the computation circuit (for example the output of divider 135 in FIG. 23b) is coupled to registers 153, 154, 155 which in turn couple the outputs to displays 150-152, respectively. The dividers 150-152 and registers 153-155 comprise a display unit 160. A separate display unit 160 may be provided for each shock absorber. Only two display units 160 are shown in FIG. 24 for ease of description. The display units 160 in FIG. 24 may be, for example, for the respective front shock absorbers of the vehicle.

In some instances, it is desirable to determine the ratio of the value of $h_1$, $h_2$ and/or $h_3$ between the pair of front shock absorbers or between the pair of rear shock absorbers. It has been found that this ratio is a quite meaningful measure of condition of shock absorbers since it is quite rare that shock absorbers will wear out at the same rate. By checking the ratio of the values for two different shock absorbers in a pair of shock absorbers, the ratio is almost always determinative of whether or not the shock absorbers need to be replaced. If the ratio exceeds a predetermined value, this is an indication that one or both of the shock absorbers being compared should be replaced. When such an indication exists, both shock absorbers are replaced to insure symmetrical operation on the vehicle.

The ratio may be determined, for example, by providing a divide circuit 171 coupled between the registers storing the $h_1$ values for, for example, the front wheels. The result of this division is the ratio in question and it is stored in register 172. Similar dividers 173, 174 are provided to determine the ratios of $h_2$ and $h_3$ for the two wheels in question and the results of the divisions are stored in respective registers 175, 176. Display units 177-179 display the results of the respective ratio calculations. It should be clear that another pair of units 160 and a second unit 170 are preferably provided for the other pair of wheels of a four-wheeled vehicle.

Instead of displays of the numerical values of the ratios, a threshhold circuit can be coupled between the dividers and the registers so that the display will be energized to display a warning signal when the ratio exceeds a predetermined value.

We claim:

1. Apparatus for evaluating the dampening proficiency of a shock absorber on a spring suspended body mass of a wheeled vehicle relative to a non-suspended wheel supported mass of the vehicle without necessitating removal of the shock absorber from its operating environment, comprising:

means for initially substantially vertically displacing only the suspended body mass of the vehicle a predetermined distance from its rest position relative to the non-suspended wheel supported mass without displacing the wheels or the wheel supported mass of the vehicle;

means for quickly releasing the displaced suspended body mass from its displaced position relative to the non-suspended wheel supported mass;

sensing means for sensing the resulting oscillating movement of the released suspended body mass relative to the non-suspended wheel supported mass and for generating a signal which is a function of the sensed resulting oscillating movement;

means coupled to said sensing means for processing and evaluating said signal corresponding to the movement of the released suspended body mass sensed by said sensing means;

said processing and evaluating means comprising means for determimimg the timing of, and suspended mass displacements at, the maxima and minima of the oscillation of the released suspended body mass; and evaluating means coupled to said determing means for evaluating the difference between adjacent maxima and/or minima, said evaluating means including means responsive to the determined timing and displacements at said maxima and minima of oscillations of the released suspended body mass for generating at least three quality factors ($h_1$: amount of expansion; $h_2$: amount of compression; and $h_3$: total damping) which correspond to the damping proficiency of the shock absorber under test; and display means coupled to said processing and evaluating means for displaying said at least three quality factors ($h_1$, $h_2$, $h_3$), thereby displaying the evaluation of the dampening proficiency of the shock absorber.

2. The apparatus of claim 1 wherein said displacing means includes control means for controlling the initial displacement of the suspended mass relative to the non-suspended mass.

3. The apparatus of claim 1 wherein said processing and evaluating means comprises means for carrying out the following calculations:

expansion ($h_1$) =

$$\left( \log \frac{\text{position of suspended mass at } t_1}{\text{position of suspended mass at } t_2} \right) / (t_2 - t_1)$$

compression ($h_2$) =

$$\left( \log \frac{\text{position of suspended mass at } t_2}{\text{position of suspended mass at } t_3} \right) / (t_3 - t_2)$$

total damping ($h_3$) =

$$\left( \log \frac{\text{position of suspended mass at } t_1}{\text{position of suspended mass at } t_3} \right) / (t_3 - t_1)$$

where $h_1$, $h_2$ and $h_3$ are said quality factors of the shock absorber under test, and $t_1$, $t_2$ and $t_3$ are the timings of respective adjacent maxima or minima of the oscillation of the released suspended mass.

4. The apparatus of claim 1 or 3 wherein said processing and evaluating means further comprises means for determining the base line of the oscillation of said spring suspended body mass.

5. The apparatus of claim 4 wherein said maxima and minima are determined relative to said base line.

6. The apparatus of claim 4 wherein said means for determining the base line of the oscillation of said object comprises means for determining the slope of the oscillation of said spring suspended body mass, and means for determining when the slope of said oscillation is one, the point where said slope is one being the base line of oscillation.

7. The apparatus of claim 1 or 3 wherein said processing and evaluating means comprises means for comparing the values of $h_1$, $h_2$ and $h_3$ of two shock absorbers of a pair of shock absorbers of said spring suspended body mass, and means for displaying an indication that said ratio exceeds a predetermined value.

8. The apparatus of claim 1 wherein said means for sensing the movement of the raised suspended mass relative to said non-suspended mass further comprises an ultrasonic transceiver, said ultrasonic transceiver being fixedly attached to said suspended mass and capable of transmitting ultrasonic waves, reflecting said ultrasonic waves off of the ground plane or similar reflecting means fixedly located relative to said non-suspended mass, and receiving said reflected ultrasonic waves; and said means for processing and evaluating the movement sensed by the means for sensing relative movement of the suspended mass further comprising means for measuring the displacement of the suspended mass relative to said non-suspended mass versus time through the measurement of the Doppler shift of the reflected ultrasonic wave once the raised suspended mass is released from its raised position.

9. The apparatus of claim 8 wherein said ultrasonic transceiver is fixedly attached to said suspended mass by a suction mounting.

10. The apparatus of claim 9 wherein said ultrasonic transceiver is fixedly attached to said suspended mass by a magnetic mounting.

11. The apparatus of claim 1 wherein said means for sensing the movement of the raised suspended mass relative to the non-suspended mass further comprises an input transducer comprising a first and second elongated slider element slideably mounted to each other so that said first and second slider elements slide relative to one another along their longitudinal axes, said first slider having a rack gear along its longitudinal axis, a circular gear having teeth enmeshed with said rack gear of said first slider, said circular gear having an axis of rotation attached to said second slider such that upon attachment of one of said first or second sliders to said suspended mass and the attachment of the remaining slider to ground or said non-suspended mass and release of the raised suspended mass, said circular gear will remain enmeshed with said rack gear and be rotated by said rack gear throughout the movement of the moving suspended mass which causes said sliders to slideably move relative to each other;

means operatively associated with said circular gear for converting the number of circular gear rotations into input electrical impulses; and means operatively associated with said circular gear for differentiating between rotational directions of said circular gear.

12. The apparatus of claim 11 wherein said means for converting the number of circular gear rotations into input electrical impulses comprises:

a first aperture in said circular gear; and an optical sensing means comprising a first light source and a first optical sensor on opposite sides of said circular gear and in alignment with said aperture, such that the light from said first light source may pass through the aperture of said circular gear and be detected by said first optical sensor conditional upon the rotational position of said circular gear relative to said optical sensing means;

whereby upon movement of said first slider relative to said second slider and corresponding rotation of said circular gear, said aperture passes through said first optical sensing means once each revolution of said circular gear along its axis, allowing said first optical sensing means to determine the movement of said first slider relative to said second slider.

13. The apparatus of claim 12 wherein said means for differentiating between rotational directions of said circular gear comprises:

a second aperture in said circular gear located at a different radial distance from the axis of said circular gear than said first aperture, said second aperture having a different shape than said first aperture, such that only one edge of said second aperture is aligned tangentially to the radius of said circular gear extending to the corresponding edge of said first aperture;

second optical sensing means comprising a second light source and a second optical sensor being separated by the plane of said circular gear and aligned with said second aperture, said optical sensing means further being fixed relative to the circular gear such that the light from said second light source may pass through said second aperture of said circular gear and be detected by said second optical sensor conditioned upon the rotational position of said circular gear relative to said rack gear, such that upon rotation of the circular gear in the direction of the aligned edges of said first and second apertures, said first and second optical sensors will simultaneously detect light from their respective light sources, while upon rotation of the circular gear in the opposite direction, said first and second optical sensors will not simultaneously detect light from their respective light sources; and means coupled to said optical sensors for decoding the sequence of activation of said first and second optical sensors.

14. A method for evaluating the dampening proficiency of a shock absorber on a spring suspended mass relative to a non-suspended mass of a wheeled vehicle without necessitating the removal of the shock absorber from its operating environment between the suspended and non-suspended masses, comprising:

(a) raising the suspended mass relative to the non-suspended mass, without displacing the non-suspended mass or the wheels of the vehicle, (b) releasing quickly and safely the raised suspended mass to permit it to drop relative to the non-suspended mass, (c) sensing the resulting oscillating movement of the suspended mass relative to the non-suspended mass over a period of time following release of the suspended mass from its raised position, and generating a signal which is a function of the sensed resulting oscillating movement of the suspended mass, (d) processing and evaluating the signal corresponding to the oscillating movement of the released suspended mass relative to the non-suspended mass sensed, (e) said processing and evaluating step comprising determining the magnitudes of the maxima and minima of the oscillation of the released suspended mass, determining the timings of said maxima and minima, and evaluating the difference between adjacent maxima and/or minima and generating at least three quality factors ($h_1$: amount of expansion; $h_2$: amount of compression; and $h_3$: total damping) which correspond to the damping proficiency of the shock absorber under test; and (f) displaying the evaluation of the dampening proficiency of the shock absorber.

15. The method of claim 14 wherein said processing and evaluating step comprises carrying out the following calculations:

expansion $(h_1) =$ $$\left( \log \frac{\text{position of suspended mass at } t_1}{\text{position of suspended mass at } t_2} \right) / (t_2 - t_1)$$

compression $(h_2) =$ $$\left( \log \frac{\text{position of suspended mass at } t_2}{\text{position of suspended mass at } t_3} \right) / (t_3 - t_2)$$

total damping $(h_3) =$ $$\left( \log \frac{\text{position of suspended mass at } t_1}{\text{position of suspended mass at } t_3} \right) / (t_3 - t_1)$$

where $h_1$, $h_2$ and $h_3$ are said quality factors of the shock absorber under test, and $t_1$, $t_2$ and $t_3$ are the timings of respective adjacent maxima or minima of the oscillation of the released suspended mass.

16. The method of claim 14 or 15 wherein said processing and evaluating step comprises determining the base line of the oscillation of said spring suspended mass.

17. The method of claim 16 wherein said maxima and minima are determined relative to said base line.

18. The method of claim 16 wherein said base line of said oscillation of said suspended mass is determined by determining the slope of the oscillation of said suspended mass, and then determining when the slope of said oscillation is one, the point where said slope is one being indicative of the base line of said oscillation.

19. The method of claim 14 or 15 wherein said processing and evaluating step further comprises comparing the values of $h_1$, $h_2$ and $h_3$ of two shock absorbers of a pair of shock absorbers, and then displaying an indication that said ratio exceeds a predetermined value.

* * * * *